United States Patent [19]
Hehl

[11] Patent Number: 4,645,446
[45] Date of Patent: * Feb. 24, 1987

[54] INJECTION MOLDING MACHINE WITH SELF-CONNECTING EJECTION DEVICE

[76] Inventor: Karl Hehl, Arthur-Hehl-Strasse 32, 7298 Lossburg 1, Fed. Rep. of Germany

[*] Notice: The portion of the term of this patent subsequent to Oct. 8, 2002 has been disclaimed.

[21] Appl. No.: 752,924

[22] Filed: Aug. 22, 1985

Related U.S. Application Data

[63] Continuation of Ser. No. 555,355, Nov. 28, 1983, Pat. No. 4,545,753.

[30] Foreign Application Priority Data

Nov. 27, 1982 [DE] Fed. Rep. of Germany ....... 3243991

[51] Int. Cl.[4] .............................................. B29C 1/00
[52] U.S. Cl. .................................... 425/350; 425/351; 425/422; 425/424; 425/436 R; 425/436 RM; 425/444; 425/556; 425/589; 425/DIG. 221
[58] Field of Search ........... 425/190, 193, 195, 192 R, 425/350, 351, 422, 424, 436 R, 436 RM, 444, 450 T, 556, 589, DIG. 221

[56] References Cited

U.S. PATENT DOCUMENTS

| | | | |
|---|---|---|---|
| 3,362,046 | 1/1968 | Blumer | 425/556 |
| 3,844,703 | 10/1974 | Hutter | 425/444 |
| 4,005,964 | 2/1977 | Bishop | 425/589 |
| 4,545,753 | 10/1985 | Hehl | 425/422 |

*Primary Examiner*—Jay H. Woo
*Assistant Examiner*—Timothy W. Heitbrink
*Attorney, Agent, or Firm*—Joseph A. Geiger

[57] ABSTRACT

An ejection device in a die closing unit of an injection molding machine in which the ejector piston rod, reaching from behind through the movable die carrier and into an engagement cavity in the back plate of the movable die half, is automatically engaged with, or disengaged from, the ejector plate, in the course of the movement of a die assembly into and out of the operating position, in conjunction with a mechanized die exchange procedure. A connecting socket at the extremity of the piston rod cooperates with a connecting plug on the back side of the ejector plate. A brief interruption of the transfer movement, obtained by means of a stop-start mechanism responsive to the die assembly transfer movement, allows for the piston rod to be extended into, or retracted from, the engagement cavity.

10 Claims, 14 Drawing Figures

INJECTION MOLDING MACHINE WITH SELF-CONNECTING EJECTION DEVICE

RELATED U.S. APPLICATION DATA

Continuation of Ser. No. 555,355, Nov. 28, 1983, now U.S. Pat. No. 4,545,753.

BACKGROUND OF THE INVENTION

1. Field of the Invention

The present invention relates to injection molding machines and, more particularly, to an injection molding machine equipped with an ejection device and a releasable connection between the ejector drive of the die closing unit and the ejector plates and ejector pins of interchangeable injection molding die assemblies.

2. Description of the Prior Art

When an injection molding machines is used for relatively short production runs, the changeover to the next production run represents a crucial time element in the productive efficiency of the machine. A major component of the changeover time is the time which is required for the exchange of injection molding dies, i.e. the removal of one die assembly and the insertion, connection and conditioning of the next die assembly.

Among the mechanical connections which have to be made in the process of installing a new die assembly is the ejector drive connection which establishes a drive link between the piston rod of the hydraulic actuator of the die closing unit and an axially movable ejector plate with a plurality of ejector rods forming part of each die assembly.

The opening and closing of this drive connection is in many cases made difficult by the additional problem of poor accessibility, particularly in the case of a die closing unit which uses a single axially aligned hydraulic cylinder assembly with a power piston attached to the movable die carrier member, and where the ejector cylinder is arranged inside the power piston. The ejector plate being located at the back side of the movable die half, access to the connection is severely limited.

It has therefore already been suggested previously to arrange the ejector drive in such a way that the drive connection is established automatically by an ejector clutch, in a forward movement of the ejector piston rod in the direction of the ejector plate.

In one prior art device, which is disclosed in U.S. Pat. No. 3,844,703, the ejector clutch is arranged to open every time the ejector piston reaches its rearward end position, the clutch closing again as soon as the ejector piston moves forwardly. This is accomplished by means of a spring-loaded sleeve on the ejector clutch which, by being stopped against an abutment shortly before the end of the ejector return stroke, is displaced relative to the clutch, thereby allowing two radially movable coupling members to free the ejector piston rod.

Apart from the fact that the release and reengagement of the clutch mechanism at the end of every injection cycle inevitably produces wear, with the attendant risk of malfunction, this mechanism has the shortcoming of requiring a considerable amount of space, especially in the axial direction. This may make it difficult to accommodate the clutch mechanism within the movable die half.

In another prior art device, the forward extremity of the ejector piston rod snaps into an ejector clutch, when the ejector piston is moved forwardly against the ejector plate of the movable die half. Release of the clutch requires the use of a rod-like special tool which reaches radially through the attachment plate of the movable die half. This device is disclosed in the German Offenlegungsschrift No. 31 00 659.

SUMMARY OF THE INVENTION

Underlying the present invention is the primary objective of suggesting a simplified and improved ejection device with a connection between the ejector drive and the ejector plate of the movable die half of the injection molding die which is automatically engaged and disengaged in the course of the movement of a die assembly into and out of its operating position, as part of a mechanized die insertion procedure.

The present invention proposes to attain this objective by suggesting an ejection device in which the ejector drive is a hydraulic cylinder assembly which is arranged centrally in, and solidary with, the movable die carrier frame, with an ejector piston rod which extends axially through the movable die carrier frame, into an engagement cavity in the back plate of the movable die half, whereby the ejector plate and the extremity of the ejector piston rod define connecting means for the engagement and disengagement of the ejector piston rod with the ejector plate, in a transverse movement of the movable die half along the mounting face of the movable die carrier frame.

In a preferred embodiment of the invention, the connecting means features a connecting socket at the forward extremity of the ejector piston rod and a matching connecting plug attached to the back side of the ejector plate, so as to extend into the engagement cavity.

The connecting plug of the ejector plate is preferably a simple body of rotation with a head portion at its extremity which is set off by a neck portion of smaller diameter. The cooperating connecting socket of the ejector piston rod has two matching U-shaped, laterally open recesses with semi-circular bottoms, the radii of the latter being in central alignment with the axis of the ejector piston rod, so that the recesses form cradles for the head and neck portions of the connecting plug.

The flange portion formed by the two unequal U-shaped recesses is engageable, through a transverse displacement of the movable die half in relation to the movable die carrier frame, into the neck portion of the connecting plug to provide a drive connection between the ejector drive and the ejector plates in the movable die half.

As part of a further improvement of the invention, it is suggested that the transverse displacement of the movable die half be obtained in conjunction with a program-controlled die exchange procedure, using a die exchange mechanism, by means of which a succession of die assemblies can be inserted and removed from the clamping space of the die closing unit with the aid of a transfer drive and transfer guides engaging standardized back plates of the die assembly, whereby the die assembly is in the closed state and the injection molding die is opened by only a minimal amount, just enough to provide movement clearance.

The proposed die exchange procedure which accomplishes the automatic connection of the ejection device of the invention requires a brief interruption of the transfer movement of the die assembly at a short distance from its central operating position, in order to allow for the ejector piston rod to move into, or out of, the engagement cavity, prior to final insertion or removal, respectively, of the die assembly.

For this purpose, the preferred embodiment further suggests a stop-start mechanism which is associated with the transfer drive of the die exchange mechanism. The stop-start mechanism is preferably in the form of a switch-actuating bell crank cooperating with a drive rack moving in unison with the die assembly.

The ejector piston rod consists preferably of two longitudinally adjoining length portions which are coupled together by means of two disconnectable coupling halves, so that the outer length portion of the piston rod can be removed, at least temporarily, for access to the back side of the die mounting wall of the movable die carrier frame and, if necessary, for the arrangement of auxiliary devices, such as a thread core unscrewing device, for example.

BRIEF DESCRIPTION OF THE DRAWINGS

Further special features and advantages of the invention will become apparent from the description following below, when taken together with the accompanying drawings which illustrate, by way of example, a preferred embodiment of the invention, represented in the various figures as follows.

DESCRIPTION OF THE PREFERRED EMBODIMENT

Figure 1:
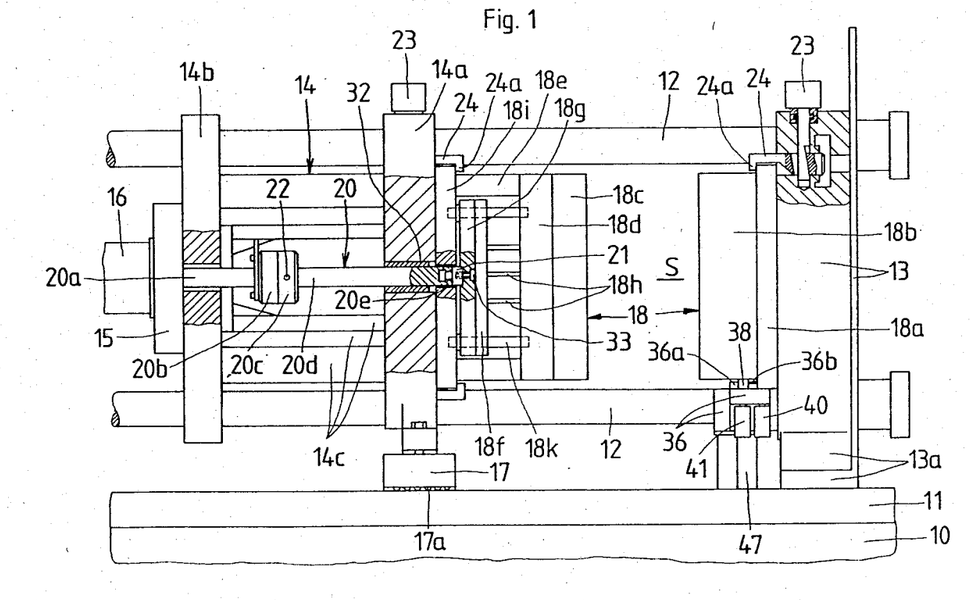
FIG. 1 shows, in a partially cross-sectioned elevational view, portions of the die closing unit of an injection molding machine with an ejection device embodying the present invention, the die closing unit being shown open.
Figure 2:
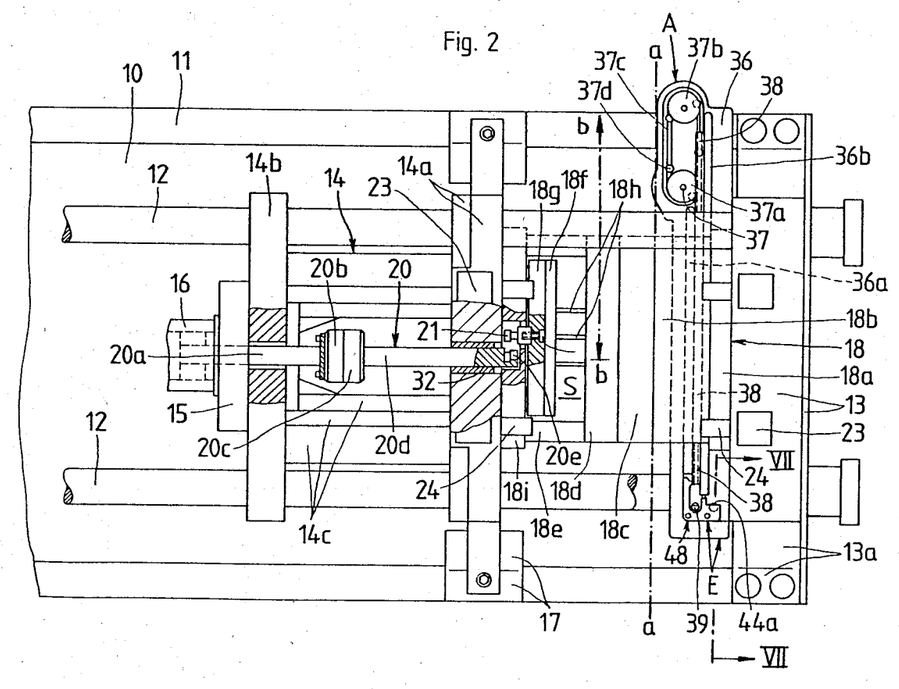
FIG. 2 shows the die closing unit of FIG. 1 in a plan view, the die closing unit being almost closed, the ejection device being disconnected, as a result of the die assembly being removed a short distance from its operating position.

FIGS. 1 and 2 of the drawing show portions of the die closing unit of a plastics injection molding machine, the die closing unit being mounted on a machine base 10. The latter is a block-shaped hollow sheet metal structure, having two horizontal guide rails 11 welded to its upper longitudinal edges.

The die closing unit consists essentially of a stationary die carrier plate 13 which is bolted to the two guide rails 11, a stationary cylinder-head plate (not shown) which is likewise bolted to the guide rails 11, and four horizontal tie rods 12 which have their extremities rigidly connected to the two stationary plates, thereby forming a rigid stationary guide frame. Two diagonally downwardly extending struts 13a serve to position the stationary die carrier plate 13 on the guide rails 11.

Engaging the tie rods 12 is an axially movable die carrier frame 14 which consists of a die mounting wall 14a, a pressure transfer wall 14b and a plurality of horizontal pressure transfer ribs 14c linking the two walls. In addition to being guided on the four tie rods 12, the movable die carrier frame 14 is supported on the two guide rails 11 by means of guide shoes 17 with recirculating rollers 17a.

To the back side of the pressure transfer wall 14b of the movable die carrier frame 14 is attached the piston rod 16 of a power cylinder which forms part of a hydraulic actuator assembly (not shown). This hydraulic actuator assembly is supported on the earlier-mentioned cylinder head plate. An attachment flange 15 serves to connect the piston rod 16 to the pressure transfer wall 14b.

In the clamping space S between the stationary die carrier plate 13 and the movable die carrier frame 14 is arranged an injection molding die, or die assembly 18, which consists of a stationary die half with an oversized back plate 18a which is clampable to the stationary die carrier plate 13 and a movable die half with a similar oversized back plate 18i which is clampable to the die mounting wall 14a of the movable die carrier frame 14.

The clamping attachment of the two die halves to their respective carrier plates 13 and 14a is accomplished by means of clamping plungers 24 mounted in the two die carrier plates, pairs of clamping plungers 24 being arranged above and below the back plates 18a and 18i of the stationary and movable die halves, respectively.

Each clamping plunger 24 has a clamping nose 24a with which it engages a clamping face of the back plate, the clamping plunger 24 being forcibly retractable into a clamping position by means of a hydraulic cylinder assembly 23 of which the piston rod has a wedge section reaching transversely through the clamping plunger 24, retracting the latter, when the piston rod of the hydraulic cylinder assembly 23 is retracted. This clamping mechanism is disclosed in more detail in my copening U.S. patent application Ser. No. 449,550 filed Dec. 13, 1982, now U.S. Pat. No. 4,473,346.

The four pairs of clamping plungers 24 are received in horizontal guide bores of the stationary die carrier plate 13 and of the die mounting wall 14a. A small release movement of the clamping plungers 24 is sufficient to allow for the die assembly 18 to be moved laterally into and out of the clamping space S. The die assembly 18 is inserted and removed in the closed state, moving with minimal axial clearance between its back plates 18a and 18i and the mounting faces of the die carriers (FIG. 2).

As can also be seen in FIG. 2, the piston rod 16 of the hydraulic cylinder assembly has a central bore forming the cylinder bore of a double-acting hydraulic cylinder assembly. The latter serves as the drive for an ejection device, consisting essentially of a piston in said central cylinder bore to which is connected an ejector piston rod 20 reaching axially forwardly, through the movable die carrier frame 14, and into disconnectable engagement with an ejector plate assembly in the movable die half.

The ejector piston rod 20 consists of an inner length portion 20a and an outer length portion 20d connected together by means of two coupling halves 20b and 20c. The forward end of the outer length portion 20d is supported in a guide bushing 32 in the center of the die mounting wall 14a, forming a connecting socket 20e at its forward extremity. The connecting socket 20e is engageable with a matching connecting plug 21 which is attached to the back side of an ejector cover plate 18g by means of a screw 33. To the ejector cover plate 18g is attached an ejector plate 18f carrying a plurality of axially extending ejector pins 18h. The two plates are displaceable in the axial direction in a space within the movable die half defined by spacer blocks 18e. The spacer blocks 18e attach the support plate 18d and the cavity plate 18c to the back plate 18i of the movable die half.

The stationary die half consists of a cavity plate 18b which is directly attached to the back plate 18a. In the closed position, the cavity plate 18c of the movable die half is pressed against the cavity plate 18b of the stationary die half at the die separation plane a—a. The ejector pins 18h reach through the support plate 18d into flush alignment with the cavity contour in the cavity plate 18c.

Figures 3, 3A:
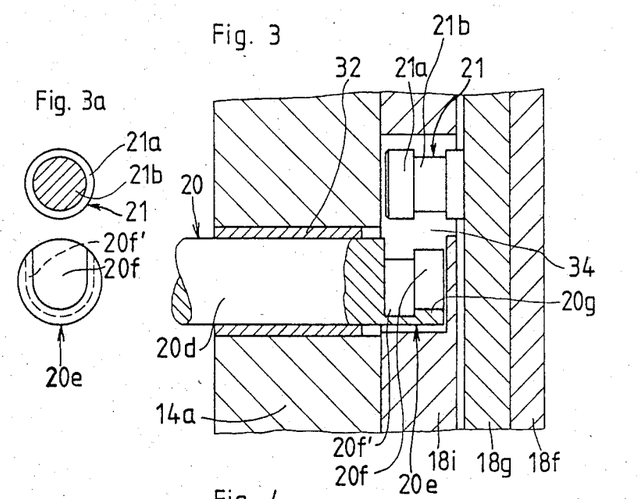
FIG. 3 shows, in an enlarged horizontally cross-sectioned detail of FIG. 2, the connecting members of the ejection device of the invention in the disengaged position.
FIG. 3a shows the disengaged connecting members of FIG. 3 in a transverse cross section.
Figures 4, 4A:
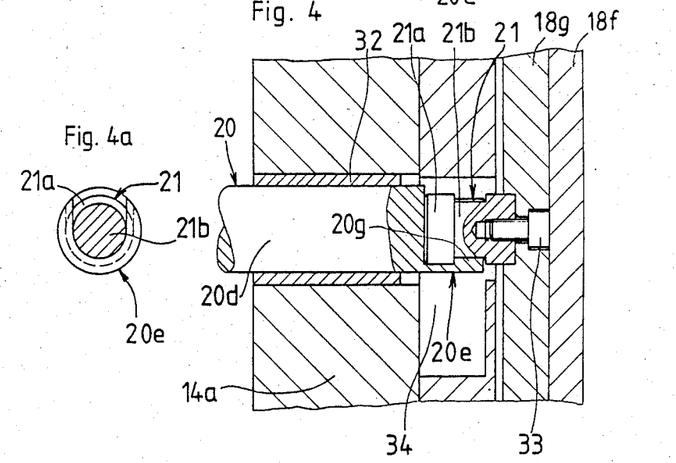
FIG. 4 corresponds to FIG. 3, showing the connecting members of the ejection device in the engaged position.
FIG. 4a is similar to FIG. 3a, showing the engaged connecting members of FIG. 4 in a transverse cross section.

As can be seen in FIGS. 3 and 4, the connecting plug 21 on the back side of the ejector cover plate 18g is a simple body of rotation, having a head portion 21a at its rearward extremity offset from its attached base portion by a neck portion 21b. The matching connecting socket 20e on the extremity of the outer length portion 20d of the ejector piston rod 20 has two radially open U-shaped recesses, a smaller neck recess 20f matching the neck portion 21b of the connecting plug 21, and a larger head recess 20f' matching its head portion 21a.

The two U-shaped recesses 20f and 20f' on the connecting socket 20e thus form a flange portion 20g which, when engaged into the neck portion 21b of the connecting plug 21, as shown in FIG. 4, produces a drive connection between the ejector piston rod 20 and the ejector plates 18g and 18f of the movable die half.

It should be understood that the cooperating shapes of the connecting plug 21 and connecting socket 20e could be reversed in such a way that the extremity of the ejector piston rod 20 is a body of rotation and the connecting plug 21 has the corresponding radially open U-shaped recesses of a connecting socket. In both cases, the outer diameter of the connecting socket is larger than the diameter of the head portion of the connecting plug.

In order to accommodate the radial engagement and disengagement displacements of the connecting plug 21 in relation to the connecting socket 20e of the ejector piston rod 20, the back plate 18i has an oblong engagement cavity 34 surrounding the connecting plug 21. The oblong engagement cavity 34 extends radially to one side of the connecting plug 21, so that the connecting socket 20e can move into the engagement cavity 34 and into a position of transverse alignment with the connecting plug 21 in which the latter can execute a transverse movement, into engagement with the connecting socket 20e of the ejector piston rod 20.

The transverse engagement movement of the connecting plug 21 into axial alignment with the connecting socket 20e is obtained as part of a die assembly transfer movement in which the die assembly 18 is inserted into the clamping space S along a transversely oriented transfer path b—b (FIG. 2), the closed die assembly 18 moving with minimal axial clearance between the mounting faces of the stationary die carrier plate 13 and of the movable die carrier frame 14.

This transfer movement is obtained by means of a transfer drive A which is designed to move a die assembly 18 between the clamping space S and a transfer table (not shown) which is arranged at the same level alongside the die closing unit, on the side of the transfer drive A. The transfer drive A may be part of an program-controllable die changing mechanism. Such a mechanism is disclosed, for example, in my copending U.S. patent application, Ser. No. 506,025, filed June 20, 1983, now U.S. Pat. No. 4,462,783.

The transfer drive A consists essentially of a horizontally arranged endless roller chain 37c which is supported on a vertical drive shaft 37 with a driving sprocket 37a and on a return sprocket 37b. The transfer drive A is mounted on a guide shelf 36 on the stationary die carrier plate 13, below the clamping space S. The guide shelf 36 includes guide tracks extending parallel to the mounting face of the stationary die carrier plate 13 and cooperating with the latter to guide the back plate 18a of the stationary die half of the die assembly 18.

Figure 5:
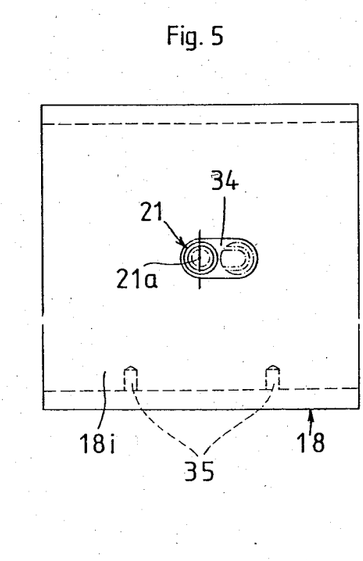
FIG. 5 shows an injection molding die in an axial end view, as seen from the side of the movable die half (left die half in FIG. 6)

The driving engagement between the transfer drive A and the die assembly 18 is obtained by means of a drive rack 38 which has on its underside a series of regularly spaced drive grooves engageable by upwardly extending drive pins 37d of the roller chain 37c. The drive rack 38, in turn, has upwardly extending entrainment pins (not shown) which are loosely engaged in entrainment bores 35 of the stationary die half (FIG. 5).

The guide track on the guide shelf 36 consists essentially of two parallel guide ledges 36a and 36b on the upper side of the guide shelf 36 which cooperate with opposite flanks of the drive rack 38 (FIG. 1). The guide ledge 36b also cooperates with the mounting face of the stationary die carrier plate 13 to guide the stationary die half during the transfer movement by engaging opposite sides of the back plate 18a. The distal extremities of the guide ledges 36a and 36b can be seen in FIG. 8. The guide shelf 36 and the guide ledge 36b have appropriate gaps for two clamping plungers 24.

On the opposite side of the clamping space S, the movable die half of the die assembly 18 is vertically positioned by a plurality of guide pins (not shown) which extend axially from the die mounting wall 14a of the movable die carrier frame 14 into contact with the bottom face of the back plate 18i. The guide pins are located at substantially the same level as the two lower clamping plungers 24 (FIG. 1).

Associated with the distal extremity of the guide shelf 36 is a stop-start mechanism E, the function of which is to briefly interrupt the transfer movement of the die assembly 18 in a position a short distance away from the normal operating position in the clamping space S. This stop position of the die assembly is shown in FIGS. 2.

As can be seen in FIGS. 7 through 11, the stop-start mechanism E features a switch-actuating bell crank 48 which is arranged near the distal extremities of the two guide ledges 36a and 36b, the bell crank 48 having a sensor arm 48a reaching into the path of the drive rack 38, in approximate extension of the extremity of the shorter guide ledge 36a. An actuating arm 48b, extending perpendicularly to the sensor arm 48a, reaches into contact with a switch plunger 44 of a stop-start switch 40.

Figure 8:
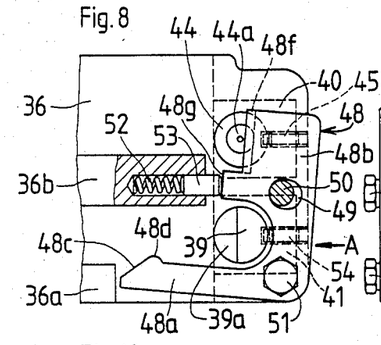
FIG. 8 shows the stop-start mechanism of FIG. 7 in a plan view.
Figure 9:
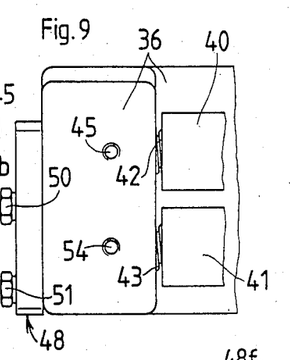
FIG. 9 shows the stop-start mechanism of FIGS. 7 and 8 in a side view from direction A in FIG. 8.

The rest position of the bell crank 48, shown in FIG. 8, is maintained by a lever return spring 52 which, engaged in a blind bore in the guide ledge 36b, bears against the actuating arm 48b through the intermediary of a push pin 53. A stationary stop pin 50, cooperating with an oblong bore 49 in the actuating arm 48b, limits the movement of the bell crank 48 under the bias of the lever return spring 52.

Figures 10, 11:
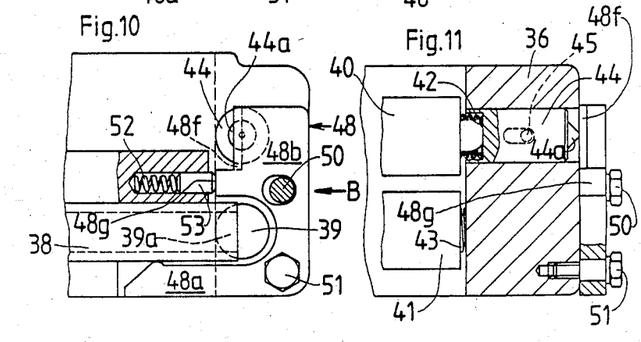
FIG. 10 corresponds to FIG. 8, showing the stop-start mechanism in a different position.
FIG. 11 shows the mechanism of FIGS. 7–10 in a side view from direction B of FIG. 10, portions being vertically cross-sectioned
Figure 12:
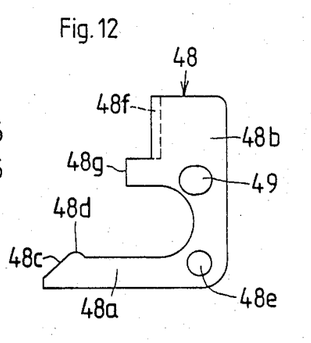
FIG. 12 shows the bell crank of the stop-start mechanism of FIGS. 7–11 in a plan view.

As the drive rack 38 advances between the two guide ledges 36a and 36b in the direction of the end position which corresponds to a fully inserted die assembly, it encounters a sensing ramp 48c on the extremity of the sensor arm 48a and, riding over a protruding sensing nose 48d at the end of the sensing ramp 48c, pivots the bell crank 48 in a counterclockwise direction about the pivot screw 51, in opposition to the bias of the lever return spring 52 (FIG. 10).

The pivoting motion of the bell crank 48 causes an actuating chamfer 48f on its actuating arm 48b to cooperate with a conical tip 44a on the upper extremity of a switch plunger 44, thereby depressing the latter and actuating the stop-start switch 40. The vertically guided switch plunger 44 is preloaded upwardly by means of a return spring 42. The latter supports itself on the switch 40, a set screw 45 engaging a groove 46 in the side of the switch plunger 44 to serve as an extension-limiting stop.

A similar switch plunger 39 is arranged in the path of the extremity of the drive rack 38 and in operative contact with a limit switch 41. A ramp 39a on the upper extremity of the switch plunger 39 reaches into the path of the drive rack 38, with the result that the switch plunger 39 is depressed, when the drive rack 38 approaches its end position, shown in FIG. 10. A return spring 43, supported on the housing of the limit switch 41, preloads the switch plunger 39 upwardly, and a set screw 54 serves as an extension-limiting stop by engaging a groove in the switch plunger 39.

Following will be described the operation of the device of the invention, in conjunction with the program-controlled exchange of a die assembly in the clamping space S of the die closing unit:

The starting position is one in which a die assembly 18 is in its operational position in the clamping space S, its two die halves being attached to the two die carriers 13 and 14 and with the die closing unit in the closed position. In the first operational step, the two die halves are released from their die carriers by releasing all the clamping plungers 24 through the actuation of their hydraulic cylinder assemblies 23.

The next step calls for a very small opening movement of the movable die carrier frame 14 in the order of 1 mm. The die assembly 18 now rests with its back plates 18a and 18i on the guide shelf 36 and on the guide pins of the die mounting wall 14a, respectively. The drive rack 38, which is coupled to the stationary die half by means of its entrainment pins, is in the position shown in FIG. 10. The piston rod 20 of the ejection device is in the position shown in FIG. 4.

The die exchange program now calls for the hydraulic motor 47 of the transfer drive A to rotate the endless roller chain 37c which, through the intermediary of the drive rack 38, pulls the die assembly 18 along the transfer path b—b in the direction of the back side of the die closing unit. After only a short transfer movement, the extremity of the drive rack 38—which, in FIG. 10, is moving to the left—releases the sensor arm 48a of the switch-actuating bell crank 48, thereby permitting the lever return spring 52 to pivot the bell crank 48 in a clockwise direction, until it reaches the position shown in FIG. 8. In this position, the actuating arm 48b has released the switch plunger 44 from its depressed position (FIG. 11), thereby permitting the return spring 42 to move the switch plunger 44 to its raised position (FIG. 7), so that the stop-start switch 40 is actuated and produces a switching response.

Figure 6:
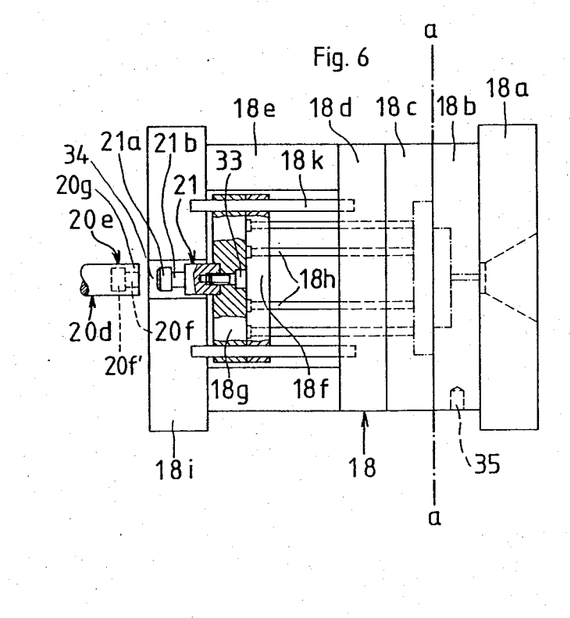
FIG. 6 shows the injection molding die of FIG. 5 in an elevational view corresponding to the view of FIG. 1, portions of the movable die half being vertically cross-sectioned.
Figure 7:
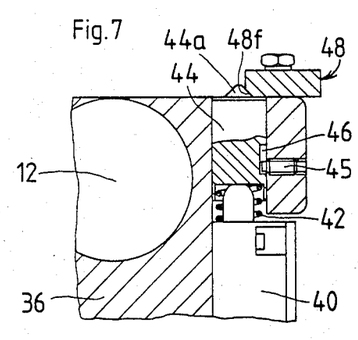
FIG. 7 shows a stop-start mechanism for a die assembly transfer device, in an enlarged transverse cross section taken along line VII—VII of FIG. 2.

The switching response of the stop-start switch 40 is twofold: Firstly, it shuts down the transfer drive A, so that the die assembly 18 comes to rest in a position which corresponds approximately to the position shown in FIGS. 2 and 3, in which the connecting plug 21 is disengaged from the connecting socket 20e of the ejector piston rod 20. Secondly, it operates the hydraulic cylinder assembly of the ejector drive to retract the ejector piston rod 20 from the engagement cavity 34 of the back plate 18i, into a position which is shown in FIG. 6.

Next, the program calls for the transfer drive A to resume its transfer movement, which is terminated, when the die assembly 18 reaches a die emplacement on a transfer table behind the die closing unit, at which point the drive rack 38 operates a limit switch with its other extremity.

A mechanism which is not part of this invention and therefore not further described herein operates the transfer table to execute a movement in which the just-removed die assembly is replaced with a new die assembly. The die exchange program now calls for the insertion of the new die assembly, including its automatic connection to the ejector drive and the clamping attachment of the die halves to the die carriers 13 and 14, in a similar sequence of operations taking place in reverse order.

Accordingly, the die insertion sequence calls for a transfer movement of the die assembly by the transfer drive A to the position shown in FIG. 2, in which the movement is interrupted by an interaction between the drive rack 38 and the switch-actuating bell crank 48. This interruption takes place, when the extremity of the drive rack 38 displaces the sensor arm 48a to pivot the bell crank 48 counterclockwise. As a result, the actuating chamfer 48f of the actuating arm 48b moves laterally against the conical tip 44a of the switch plunger 44, thereby depressing the latter and actuating the stop-start switch 40.

Again, the stop-start switch 40 also initiates an operation of the ejector drive to advance the ejector piston rod 20 from its fully retracted position to the alignment position shown in FIGS. 2 and 3, in which the connecting socket 20e reaches into the engagement cavity 34 of the die assembly.

The next step in the die insertion process is the resumption of the transfer movement by the transfer drive A, which thereby advances the die assembly to its operating position in the clamping space S, while engaging the connecting plug 21 of the die assembly into the connecting socket 20e of the ejector piston rod 20. The insertion transfer movement is stopped by the drive rack 38 reaching its end position in which it operates the limit switch 41 by depressing its associated switch plunger 39 (FIG. 10).

An important condition for the problem-free operation of the self-connecting ejection device of the invention is the achievement of a precise transverse alignment between the connecting socket 20e of the ejector piston rod 20 and the connecting plug 21 of the die assembly 18 at the end of the forward movement of the ejector piston rod 20.

In addition, it is also important for the transfer movement to stop in a position in which the center of the connecting plug 21—which is located in the center of the die assembly—is in coaxial alignment with the center of the ejector piston rod 20, as determined by the guide bushing 32 in the die mounting wall 14a. In the case of a hydraulic transfer drive, the correct alignment is achievable through appropriate vertical adjustment of the limit switch 41. In the case of a mechanical transfer drive, the end position of the transfer movement may be determined by a stop member on the stationary die carrier plate 13 which cooperates with the back plate 18a of the stationary die half.

It should be understood, of course, that the foregoing disclosure describes only a preferred embodiment of the invention and that it is intended to cover all changes and modifications of this example of the invention which fall within the scope of the appended claims.

I claim the following:

1. In a die closing unit of an injection molding machine which comprises a stationary die carrier plate and a movable die carrier plate adapted for the attachment thereto of the stationary and movable die halves of one of a plurality of interchangeable die assemblies, and which further comprises a die changing mechanism for the mechanical insertion of said die assembly into, and its removal from, the die closing unit in transfer movements along a transfer path which is oriented transversely to the center axis of the die closing unit along which the movable die carrier plate and an associated movable die half execute die opening and closing movements, and wherein the die changing mechanism includes transfer drive means for producing said transfer movements, and the movable die carrier plate and its associated movable die half define a device for ejecting the injection-molded parts from the movable die half in the open position of the die closing unit, said parts ejecting device including an ejection actuator and an ejector rod which are associated with the movable die carrier plate and arranged on the axially outer side thereof, the ejector rod being guided for ejection movements parallel to the center axis of the die closing unit and having a drive extremity pointing axially inwardly towards the movable die half, and wherein the parts ejection device further includes an ejector member forming part of the movable die half and being movable axially in relation thereto; in such a die closing unit, a mechanism for connecting the ejector member of said movable die half to the drive extremity of the ejector rod of the ejection actuator, said connecting mechanism comprising in combination:

stop-start means defined by the transfer drive means of the die changing mechanism for interrupting the transfer movements of a die assembly in a stop position which is located at a distance from an inserted position in which the die halves of the die assembly are transversely aligned with, and attachable to, their respective die carrier plates;

a transverse mounting face on the axially inner side of the movable die carrier plate and a cooperating transverse mounting face on the axially outer side of the associated movable die half, said mounting faces being arranged to remain substantially contiguous during the transfer movements of the die assembly;

an axial opening in the movable die carrier plate through which the ejector rod is movable from a retracted position in which its drive extremity is located axially outside said contiguous mounting faces to a connection position in which the drive extremity is located axially inside said contiguous mounting faces;

an axial recess in the mounting face of the associated movable die half so shaped that it accommodates the drive extremity of the ejector rod in its connection position, while permitting the die assembly to execute transfer movements between its stop position and its inserted position;

a first connecting member defined by the drive extremity of the ejector rod;

a second connecting member attached to the ejector member of the associated movable die half, said second connecting member being arranged within the axial recess of the movable die half and aligned axially with the first connecting member of the ejector rod, when the die assembly is in its inserted position; and wherein the first and second connecting members are shaped to engage each other to produce an axial drive connection between the ejector rod and the ejector member of the movable die half, when the ejector rod is in its connection position and the die assembly moves from its stop position to its inserted position; and the first and second connecting members disengage from each other, when the die assembly moves from its inserted position to its stop position.

2. A connecting mechanism as defined in claim 1, wherein the ejector rod and its first connecting member are located in the center axis of the die closing unit;

the second connecting member is a connecting plug in the form of a body of rotation which is attached to the axially outer side of the ejector member, the axis of the connecting plug coinciding with the center axis of the die assembly which, in turn, coincides with the center axis of the die closing unit, when the die assembly is in its inserted position;

the connecting plug has a head portion on its axially outer extremity and a neck portion of smaller diameter adjoining the head portion on its axially inner side; and the first connecting member is a connecting socket with a radially inwardly protruding flange portion on its axially inner extremity and a recess adjoining the flange portion on its axially outer side, said flange portion and recess having transverse openings in the direction of the transfer path of the die assembly to permit the engagement of the connecting socket flange portion into the connecting plug neck portion and the engagement of the connecting plug head portion into the connecting socket recess, in order to produce said axial drive connection.

3. A connecting mechanism as defined in claim 2, wherein
the flange portion and the adjoining recess of the connecting socket are defined by U-shaped cross-sectional profiles which are inscribed within the outer diameter of a cylindrical length portion of the ejector rod; and
the axial opening in the movable die carrier plate is a guide bore which cooperates with the cylindrical length portion of the ejector rod.

4. A connecting mechanism as defined in claim 1, wherein
the transfer drive means of the die changing mechanism includes a drive rack which is connected to the die assembly so as to move in unison therewith along the transfer path, when the die assembly executes transfer movements into and out of the die closing unit;
the stop-start mechanism of the transfer drive means includes a stop-start switch and a switch actuating member which is biased into an extended position in which it reaches into the path of the drive rack, in the area of a stop position of a switching extremity of the drive rack which corresponds to the stop position of the die assembly; and
the switching extremity of the drive rack cooperates with the switch actuator to displace it out of the path of the drive rack and to thereby operate the stop-start switch, when the drive rack reaches its stop position from either direction.

5. A connecting mechanism as defined in claim 4, wherein
the transfer drive means further includes a limit switch which is actuated by the switching extremity of the drive rack in an inserted position of the drive rack which corresponds to the inserted position of the die assembly.

6. A connecting mechanism as defined in claim 5, wherein
the transfer path defined by the transfer drive means of the die changing mechanism is a horizontal transfer path;
the drive rack is arranged below the stationary die half of the drive assembly;
the transfer drive means further includes an endless roller chain running in a horizontal loop defined by two sprockets of which at least one is supported on, and driven by, a vertical drive shaft, the roller chain carrying drive pins which are engageable with the drive rack;
the stop-start switch and the limit switch are arranged side by side and below the level of the drive rack, both switches having upwardly biased, vertically movable switch plungers;
the limit switch is arranged in transverse alignment with the movement path of the drive rack, it switch plunger protruding upwardly into the path of the drive rack, so as to be depressed by the switching extremity of the drive rack, as the drive rack approaches its inserted position; and
the switch actuating member of the stop-start switch is an actuating lever which is pivotable about a vertical pivot axis between said extended position and an actuating position, the actuating lever being under the influence of a spring urging it towards its extended position, one extremity of the actuating lever forming a nose which reaches laterally into the path of the drive rack in the extended position of the actuating lever, the other extremity of the actuating lever cooperating with the switch plunger of the stop-start switch to depress it, when the switching extremity of the drive rack pushes the nose of the actuating lever out of the path of the drive rack.

7. A connecting mechanism as defined in claim 6, wherein
the actuating lever is in the form of a bell crank having a sensor arm carrying said nose and an actuating arm cooperating with the switch plunger of the stop-start switch.

8. In a die closing unit of an injection molding machine which comprises a stationary die carrier plate and a movable die carrier plate adapted for the attachment thereto of the stationary and movable die halves of one of a plurality of interchangeable die assemblies, and which further comprises a die changing mechanism for the mechanical insertion of said die assembly into, and its removable from, the die closing unit in transfer movements along a transfer path which is oriented transversely to the center axis of the die closing unit along which the movable die carrier plate and an associated movable die half execute linear die opening and closing movements, and wherein the die changing mechanism includes transfer drive means for producing said transfer movements, and the movable die carrier plate and its associated movable die half define a device for ejecting the injection-molded parts from the movable die half in the open position of the die closing unit, said parts ejecting device including an ejection actuator with an ejector rod associated with the movable die carrier plate and arranged on the axially outer side thereof, the ejector rod being guided for ejection movements parallel to the center axis of the die closing unit and including a drive extremity pointing axially inwardly in the direction of the movable die half, and wherein the parts ejection device further includes an ejector member forming part of the movable die half and being movable axially in relation thereto; in such a die closing unit, a mechanism for connecting the ejector member of the movable die half to the drive extremity of the ejector rod of the ejection actuator, said connecting mechanism comprising in combination:
a transverse mounting face on the axially inner side of the movable die carrier plate and a cooperating transverse mounting face on the axially outer side of the associated movable die half, said mounting faces being arranged to remain substantially contiguous during the transfer movements of the die assembly;
an axial opening in the movable die carrier plate through which the ejector rod is movable from a retracted position in which its drive extremity is located axially outside said contiguous mounting faces to a connection position in which the drive extremity is located axially inside said contiguous mounting faces;
an axial recess in the mounting face of the associated movable die half so shaped that it accommodates the drive extremity of the ejector rod in its connection position, while permitting the die assembly to execute at least an end portion of the die transfer movement which includes, as one end point thereof, the inserted position of the die assembly in which its two die halves are transversely aligned with, and attachable to, their respective die carrier plates;

a first connecting member defined by the drive extremity of the ejector rod;

a second connecting member attached to the ejector member of the associated movable die half, said second connecting member being arranged within the axial recess of the movable die half and aligned axially with the first connecting member of the ejector rod, when the die assembly is in its inserted position; and wherein the first and second connecting members are shaped to engage each other to produce an axial drive connection between the ejector rod and the ejector member of the movable die half, when the ejector rod is in its connection position and the die assembly executes said end portion of the die transfer movement at the end of the die insertion movement; and the first and second connecting members disengage from each other, when the die assembly executes said end portion of the die transfer movement at the beginning of the die removal movement.

9. A connecting mechanism as defined in claim 8, wherein the ejector rod and its first connecting member are located in the center axis of the die closing unit;

the second connecting member is a connecting plug in the form of a body of rotation which is attached to the axially outer side of the ejector member, the axis of the connecting plug coinciding with the center axis of the die assembly which, in turn, coincides with the center axis of the die closing unit, when the die assembly is in its inserted position;

the connecting plug has a head portion on its axially outer extremity and a neck portion of smaller diameter adjoining the head portion on its axially inner side; and the first connecting member is a connecting socket with a radially inwardly protruding flange portion on its axially inner extremity and a recess adjoining the flange portion on its axially outer side, said flange portion and recess having transverse openings in the direction of the transfer path of the die assembly to permit the engagement of the connecting socket flange portion into the connecting plug neck portion and the engagement of the connecting plug head portion into the connecting socket recess, in order to produce aid axial drive connection.

10. A connecting mechanism as defined in claim 9, wherein the flange portion and the adjoining recess of the connecting socket are defined by U-shaped cross-sectional profiles which are inscribed within the outer diameter of a cylindrical length portion of the ejector rod; and the axial opening in the movable die carrier plate is a guide bore which cooperates with the cylindrical length portion of the ejector rod.

* * * * *